(12) United States Patent
Lee et al.

(10) Patent No.: US 7,912,519 B2
(45) Date of Patent: Mar. 22, 2011

(54) MOBILE COMMUNICATION DEVICE WITH FUNCTION-ASSIGNABLE SIDE KEY AND METHOD FOR CONTROLLING THE SIDE KEY

(75) Inventors: Hyun Ju Lee, Seoul (KR); Gwang Woo Choe, Suwon-si (KR); Chang Soo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 977 days.

(21) Appl. No.: 11/803,435

(22) Filed: May 15, 2007

(65) Prior Publication Data

US 2007/0270179 A1 Nov. 22, 2007

(30) Foreign Application Priority Data

May 16, 2006 (KR) .................. 10-2006-0043634

(51) Int. Cl.
*H04M 1/00* (2006.01)
(52) U.S. Cl. .................... 455/575.1; 455/90.2
(58) Field of Classification Search .......... None
See application file for complete search history.

(56) References Cited

U.S. PATENT DOCUMENTS

| 5,966,671 | A | * | 10/1999 | Mitchell et al. | 455/550.1 |
| 6,539,243 | B1 | * | 3/2003 | Kimura et al. | 455/550.1 |
| 2004/0116167 | A1 | * | 6/2004 | Okuzako et al. | 455/575.3 |
| 2006/0229116 | A1 | * | 10/2006 | Ishihara et al. | 455/575.3 |
| 2006/0240872 | A1 | * | 10/2006 | Yuan et al. | 455/564 |

FOREIGN PATENT DOCUMENTS

JP 2005-045580 2/2005
KR 10-2004-0024337 3/2004

* cited by examiner

*Primary Examiner* — Erika A Gary
(74) *Attorney, Agent, or Firm* — The Farrell Law Firm, P.C.

(57) ABSTRACT

A mobile communication device includes a side key having at least three buttons disposed on the side of a device body. Each button of the side key has at least two functions assigned differently and independently according to operation mode and key press time. In a method for controlling the side key, at least two functions are assigned to the side key. Receiving a press input from the side key, a control unit determines a key setting type corresponding to the received press input. Then the control unit retrieves a function corresponding to the determined key setting type from the assigned functions, and then performs the retrieved function of the side key.

13 Claims, 5 Drawing Sheets

MOBILE COMMUNICATION DEVICE WITH FUNCTION-ASSIGNABLE SIDE KEY AND METHOD FOR CONTROLLING THE SIDE KEY

PRIORITY

This application claims priority under 35 U.S.C. §119(a) to an application filed in the Korean Intellectual Property Office on May 16, 2006 and assigned Ser. No. 2006-0043634, the contents of which are incorporated herein by reference.

BACKGROUND OF THE INVENTION

1. Field of the Invention

The present invention generally relates to a mobile communication device with a side key and, more particularly, to a mobile communication device having a side key to which various functions can be differently and independently assigned according to a mode and a press time, and a method for controlling the function-assignable side key.

2. Description of the Related Art

With a remarkable growth of related technologies, mobile communication devices, e.g., a mobile phone, have become a necessary convenience of modern life. Moreover, to satisfy a variety of increasing demands of users, recent mobile communication devices have had various, specific, useful functions and applications in addition to their inherent and essential functions.

In general, such a mobile communication device has a key input system for producing input signals by press actions of a user. The key input system should have an appropriate interface for enabling a user to use various functions and applications of the device, and should offer a simple, convenient accessibility to execute such functions and applications. In view of these two sides, the key input system of the mobile communication device has continuously improved in key type, key configuration, key function, etc.

Most keys of the mobile communication device are typically disposed on the front of the mobile device body. Only a limited number of keys are disposed on the side of the mobile device body and they are called side keys. Representative one of the side keys is a volume key, which is composed of two buttons for turning up and down the volume. In order for a user to easily adjust voice volume during a call, the volume key is conveniently located on the side of the device body.

However, a conventional side key has a fixed, i.e., unvaried, function of its own. For example, the volume key produces input signals for executing just a natural function for adjusting the volume, e.g., voice volume, ring tone volume, etc., during either a call mode or an idle mode.

FIG. 1 shows, in a perspective view, a side key 12 of a conventional mobile communication device 10. In the example of FIG. 1, the side key 12 is the above-mentioned volume key and composed of function-fixed two buttons, namely, volume up and down buttons 12a and 12b, respectively.

Some conventional mobile communication devices may have another side key, such as a camera key, an MP3 play key, an auto answer key, etc. Such a side key is a kind of a shortcut or hot key for allowing a direct access to a specific application. However, such a side key as well executes only its own natural function, initially assigned and unvaried, and cannot execute several functions. Moreover, there is no side key that allows a user to freely establish and change the function associated with the key.

SUMMARY OF THE INVENTION

The present invention addresses at least the above-described problems and/or disadvantages, and provides a mobile communication device and a method that allow assigning and changing various functions to a side key.

The present invention also provides a mobile communication device and a method that allow easily and quickly accessing and executing various functions and applications of the device by using a side key.

According to an aspect of the present invention, a mobile communication device includes a device body having a side, and a side key having at least three buttons disposed on the side of the device body. Each button has at least two functions assigned differently and independently according to at least one of an operation mode and a key press time.

In this device, the functions of each button of the side key may be assigned differently according to an idle mode and a menu mode. Further, the function assigned in the idle mode may act as a shortcut key, and the function assigned in the menu mode may act as a specific function key. Also, the functions of each button of the side key may be assigned differently according to a short press and a long press.

The buttons may have an upper button, a middle button and a lower button, which are disposed in a row. The middle button may have, in an idle mode, a first function selected among a main menu, a phone book search, a call log view, voice recognition, take a photo, a help page view, an e-mail write, a message write, and none, and may have, in a menu mode, a second function corresponding to one selected among an OK key, a left soft key, a right soft key, and none. Additionally, each of the upper button and the lower button may have, in an idle mode, a first function selected among a call log view, voice recognition, take a photo, a help page view, an e-mail write, a message write, a ring tone volume control, and none, and may have, in a menu mode, a second function selected between a volume control and a menu navigation.

According to another aspect of the present invention, a mobile communication device includes a side key disposed on a side of a device body and having at least three buttons. Each button has at least two functions assigned differently and independently according to key setting types. The device further includes a key function database storing the key setting types and assignable functions of each key setting type, and a side key setting unit establishing the functions of each button of the side key according to the key setting types and storing the established functions in the key function database. The device still further includes a key function decision unit receiving a press input from the side key, determining a key setting type corresponding to the press input, and retrieving the established function corresponding to the determined key setting type from the key function database, and a function execution unit performing the retrieved function of the side key.

In this device, the key setting types may include at least one of an operation mode and a key press time. The operation mode may have an idle mode and a menu mode, and the key press time may have a short press and a long press.

According to still another aspect of the present invention, a method for controlling a side key of a mobile communication device includes assigning at least two functions to the side key; receiving a press input from the side key; determining a key setting type corresponding to the received press input; retrieving a function corresponding to the determined key setting type from the assigned functions; and performing the retrieved function of the side key.

In this method, the assigned functions of the side key may be different according to an idle mode and a menu mode. The function assigned in the idle mode may act as a shortcut key, and the function assigned in the menu mode may act as a specific function key. Further, the assigned functions of the side key may be different according to a short press and a long press.

The assigning of the functions of the side key may include establishing the side key in an idle mode to have a first function selected among a main menu, a phone book search, a call log view, voice recognition, take a photo, a help page view, an e-mail write, a message write, and none, and establishing the side key in a menu mode to have a second function corresponding to one selected among an OK key, a left soft key, a right soft key, and none.

Additionally, the assigning of the functions of the side key may include establishing the side key in an idle mode to have a first function selected among a call log view, voice recognition, take a photo, a help page view, an e-mail write, a message write, a ring tone volume control, and none, and establishing the side key in a menu mode to have a second function selected between a volume control and a menu navigation.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Figure 1:
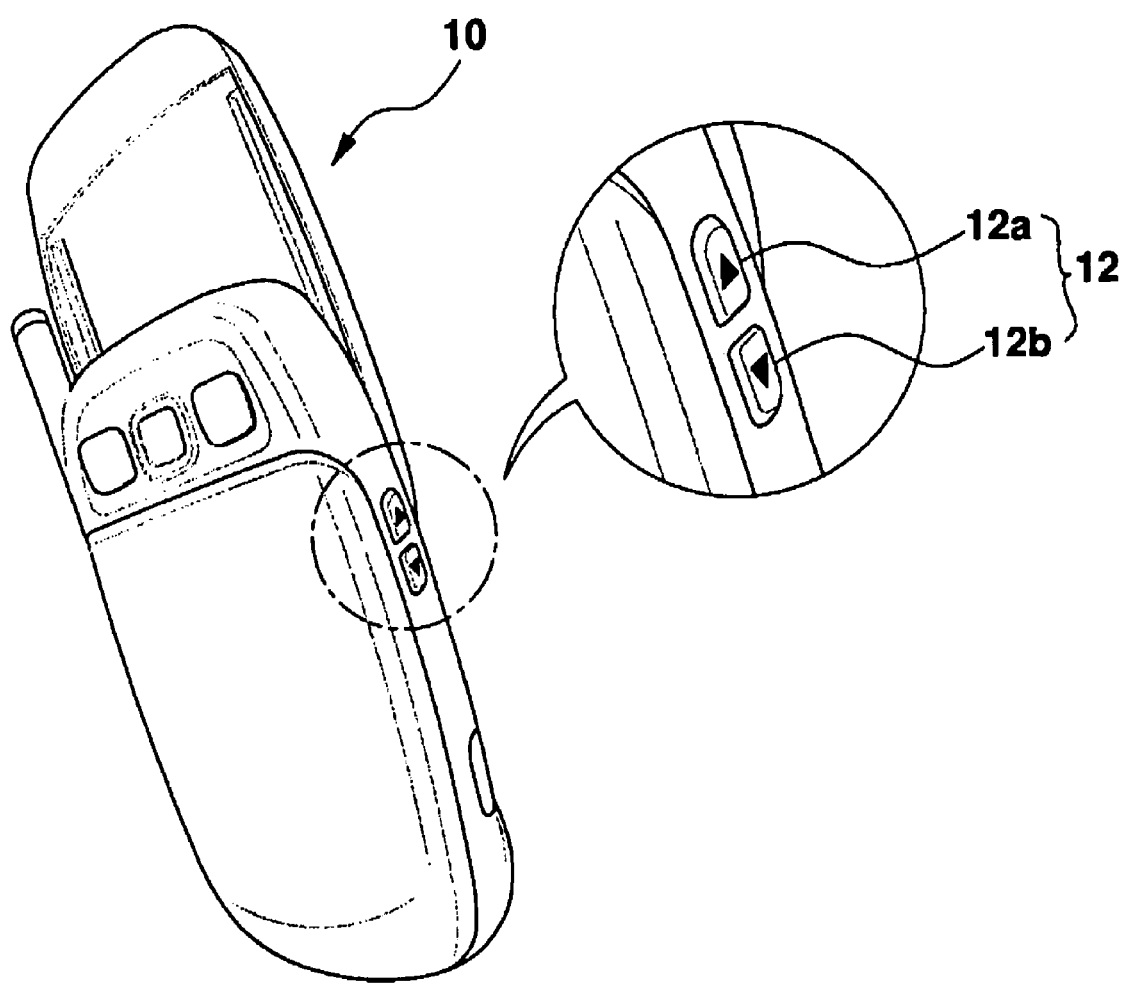
FIG. 1 is a perspective view showing a side key with function-fixed two buttons of a conventional mobile communication device.

Preferred embodiments of the present invention will now be described more fully with reference to the accompanying drawings. This invention may, however, be embodied in many different forms and should not be construed as limited to the preferred embodiments set forth herein. Rather, the disclosed embodiments are provided so this disclosure will be thorough and complete, and will fully convey the scope of the invention to those skilled in the art. The principles and features of this invention may be employed in varied and numerous embodiments without departing from the scope of the invention. Well-known structures and processes are not described or illustrated in detail to avoid obscuring the essence of the present invention. Like reference numerals are used for like and corresponding parts of the various drawings.

Figure 2:
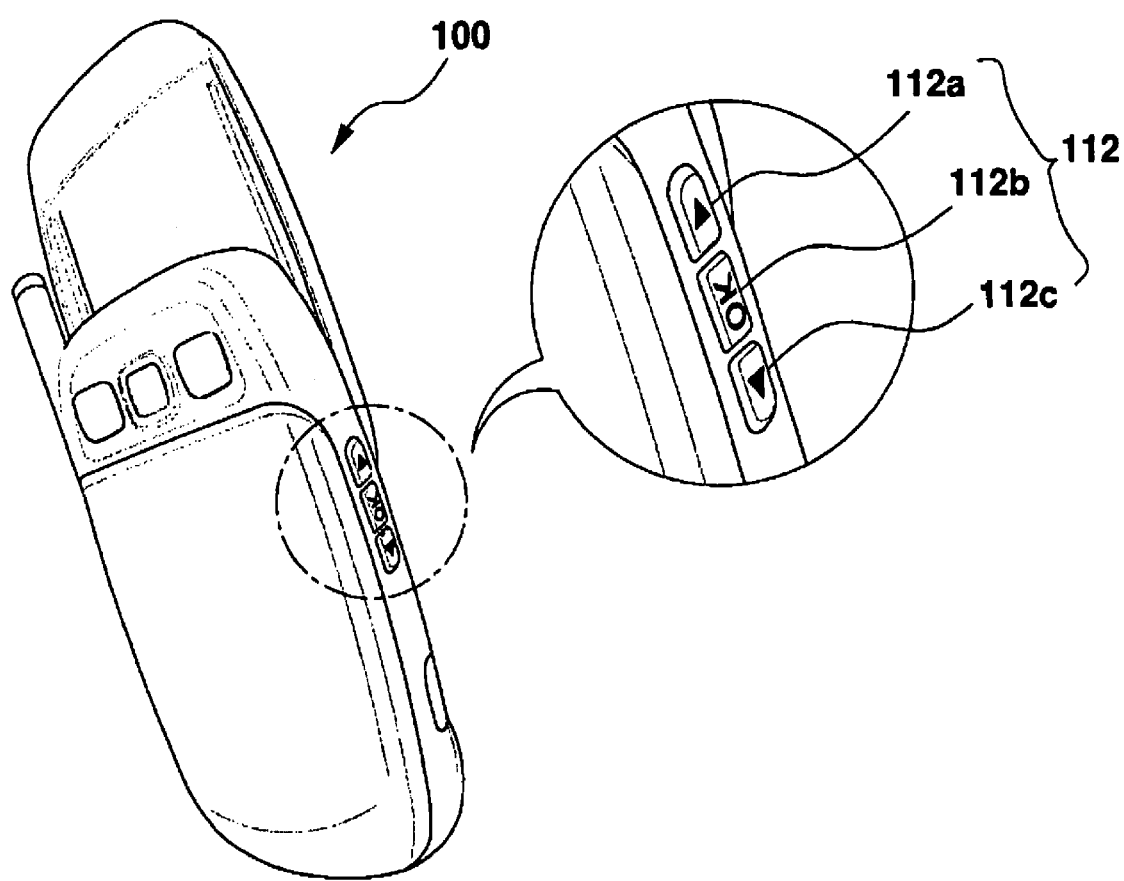
FIG. 2 is a perspective view showing a side key with function-assignable three buttons of a mobile communication device in accordance with the present invention.

FIG. 2 shows, in a perspective view, a side key 112 composed of function-assignable three adjacent buttons 112a, 112b and 112c of a mobile communication device 100 in accordance with the present invention.

As shown in FIG. 2, the mobile communication device 100 includes a side key 112 having, as an example, three buttons 112a, 112b and 112c, which are disposed in a row on the side of a device body. Such a side key 112 can be called a three-button side key, which is exemplary only and not to be considered as a limitation of the present invention. Side keys having plural buttons exceeding three may also be used in the present invention. In FIG. 2, three buttons are called an upper button 112a, a middle button 112b, and a lower button 112c, respectively.

Each button 112a, 112b or 112c of the side key 112 does not execute an unvaried function, but executes a changeable function established in a setting menu. That is, a user can assign a particular function to each button 112a, 112b or 112c by selecting one among various assignable functions displayed in a setting menu in additional, a function of each button 112a, 112b or 112c may be assigned independently and differently.

On the other hand, functions of the side key 112 may vary according to operation modes of the device 100. That is, the side key 112 may have different functions in an idle mode and a menu mode. For example, the side key 112 in an idle mode acts as a shortcut key for allowing a direct access to a specific application, whereas the side key 112 in a menu mode acts as a specific function key.

Furthermore, functions of the side key 112 may be established separately according to a key press time. That is, the side key 112 may have different functions in a short press and a long press.

The following Table 1 shows an example of key setting types according to buttons, operation modes and key press time. Further, the following Table 2 shows an example of assignable functions for each key setting type.

TABLE 1

| Type | Button | Operation Mode | Key Press Time |
| --- | --- | --- | --- |
| 1 | Middle | Idle Mode | Long Press |
| 2 | Middle | Menu Mode | Long Press |
| 3 | Upper | Idle Mode | Short/Long Press |
| 4 | Upper | Menu Mode | Short Press |
| 5 | Lower | Idle Mode | Short/Long Press |
| 6 | Lower | Menu Mode | Short Press |

TABLE 2

| Type | Assignable Function |
| --- | --- |
| 1 | Main Menu, Phone Book Search, Call Log View, Voice Recognition, Take a Photo, Help Page View, E-mail Write, Message Write, None |
| 2 | OK Key, Left Soft Key, Right Soft Key, None |
| 3, 5 | Call Log View, Voice Recognition, Take a Photo, Help Page View, E-mail Write, Message Write, Ring Tone Volume Control, None |
| 4, 6 | Volume Control, Menu Navigation |

The middle button 112b in the idle mode can be designated to act as a shortcut key. Specifically, when long-pressed in the idle mode, as seen from Type 1 in Tables 1 and 2, the middle button 112b has a function selected among a main menu, a phone book search, a call log view, voice recognition, take a photo, a help page view, an e-mail write, a message write, and none. Further, in the menu mode the middle button 112b can be established to act as a specific function key. Specifically, when long-pressed in the menu mode as seen from Type 2 in Tables 1 and 2, the middle button 112b has a function corresponding to one selected among an OK key, a left soft key, a right soft key, and none.

On the other hand, the function of the upper button 112a or the lower button 112c in the idle mode can be established separately, depending on the key press time of the associated key, such as a short press or a long press. As seen from Types 3 and 5 in Tables 1 and 2, such a function is selected among a call log view, voice recognition, take a photo, a help page view, an e-mail write, a message write, a ring tone volume control, and none. When in the menu mode the upper button 112a or the lower button 112c is short-pressed, the function thereof can be established to a volume control or a menu navigation as seen from Types 4 and 6 in Tables 1 and 2.

As previously discussed, the function of the side key 112 is not fixed, but assigned among a plurality of certain functions. A user can therefore select particular functions among such assignable functions and then separately assign the selected functions to the respective buttons of the side key.

For example, a function of taking a photo may be assigned to a short press of the upper button 112a in the idle mode, and an OK key may be assigned to a long press of the middle button 112b in the menu mode. In this case, once a user presses shortly the upper button 112a in the idle mode, an application of taking a photo is immediately executed in the menu mode. Then a user can take a photo by long-pressing the middle button 112b.

Additionally, a ring tone volume control may be assigned to a long press of the lower button 112c in the idle mode. If a user long-presses the lower button 112c in the idle mode, a pop-up menu for a ring tone volume control is displayed. Then a user can adjust a ring tone volume by pressing the upper button 112a or the lower button 112c.

The above-discussed assignable functions and key setting types in Tables 1 and 2 are only examples and are not to be considered as a limitation of the present invention. Functions and key setting types may be varied as desired. For example, although not shown, the function of the middle button 112b may also be established when short-pressed.

In a mobile communication device of the present invention, the function of the side key can be established and changed. A side key setting menu shown in FIG. 3 allows such establishing and changing the function of the side key.

Figure 3:
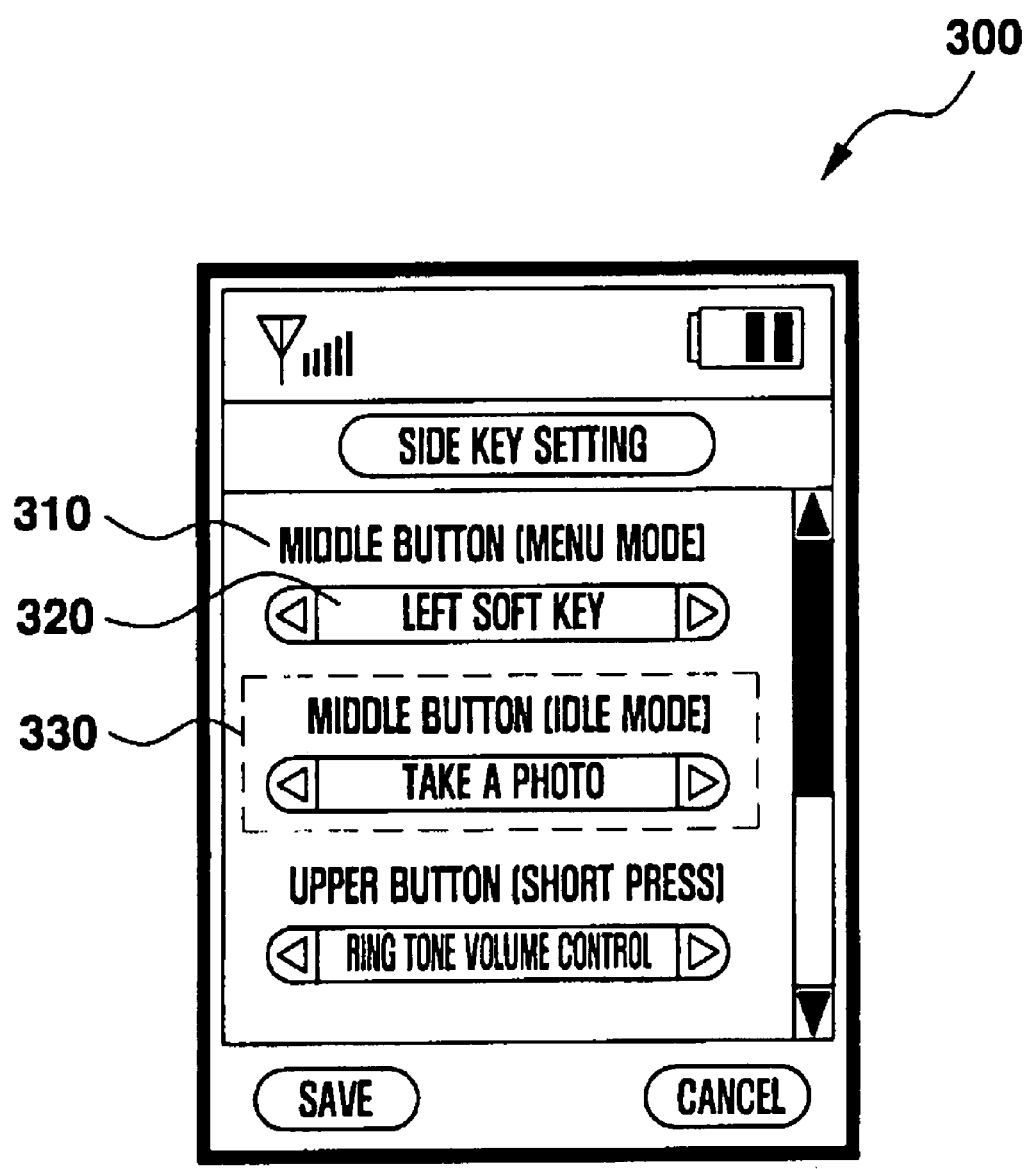
FIG. 3 is a view showing a display screen for a side key setting menu of a mobile communication device in accordance with the present invention.

Referring to FIG. 3, when a side key setting menu 300 is executed, a display unit provides on a screen key setting types 310 and their assignable functions 320. Moving a focus 330 by pressing upper and lower navigation keys, a user can select one of the key setting types 310. Then pressing left and right navigation keys, a user can select one of the assignable functions 320 in the selected key setting type 310.

Figure 4:
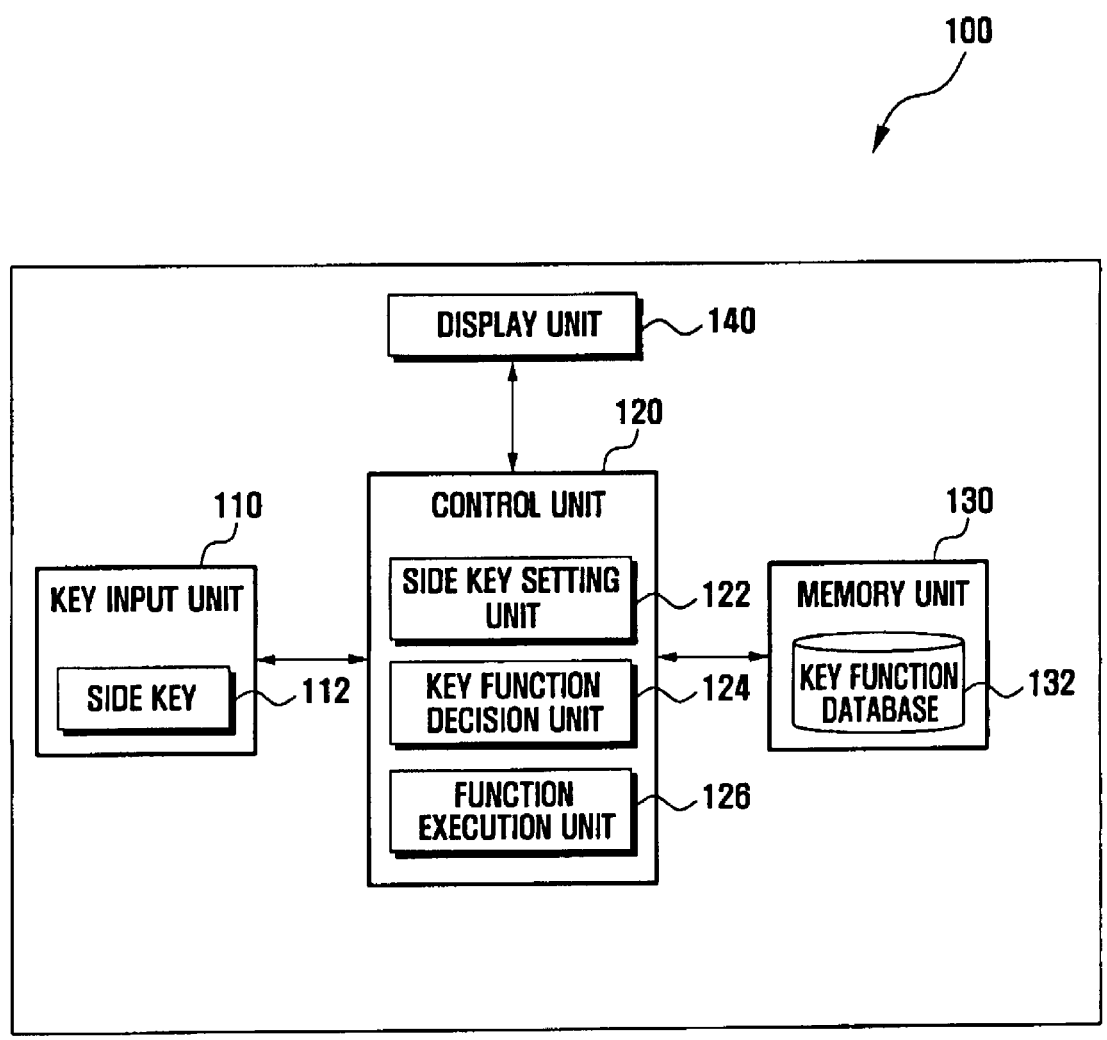
FIG. 4 is a block diagram showing a mobile communication device having a function-assignable side key in accordance with the present invention.

FIG. 4 shows a mobile communication device in accordance with the present invention. The mobile communication device 100 includes a key input unit 110, a control unit 120, a memory unit 130, and a display unit 140. The key input unit 110 has a side key 112 composed of a plurality of buttons. The control unit 120 has a side key setting unit 122, a key function decision unit 124, and a function execution unit 126. The memory unit 130 has a key function database 132.

The key input unit 110 receives press actions of a user and then produces corresponding input signals for the device 100. Especially, the side key 112 of the key input unit 110 has three or more buttons disposed on the side of a device body. For example, a series of three adjacent buttons may constitute the side key 112, as discussed above. Each button of the side key 112 has functions assigned separately according to the operation mode and key press time of the associated button. The functions of the side key 112 may be changed by selection of the user. Therefore, the side key 112 allows easily and quickly accessing and executing specific applications or functions desired by a user.

The control unit 120 controls the whole operation of the device 100. Especially, the side key setting unit 122 of the control unit 120 offers the above-discussed side key setting menu to the display unit 140 and receives input of a user for a function selection from the key input unit 110. Then the side key setting unit 122 establishes functions of each button of the side key 112 according to operation mode and key press time. Such established functions are stored in the key function database 132 of the memory unit 130.

The key function decision unit 124 receives input of a user from the side key 112 and then decides a key setting type corresponding to the input. That is, when a certain button of the side key 112 is pressed, the key function decision unit 124 determines which of the buttons is pressed, whether the mode is an idle mode or a menu mode, and whether the press time is short or long. Then the key function decision unit 124 retrieves the function corresponding to the determined key setting type from the key function database 132.

The function execution unit 126 performs the retrieved function of the side key, depending on the result of decision by the key function decision unit 124.

The memory unit 130 stores various programs and data for operation of the device 100. The key function database 132 in the memory unit 130 stores key setting types and assignable functions that may include, e.g., setting types shown in Table 1, for the side key 112, and, e.g., assignable functions shown in Table 2, of each key setting type.

The display unit 140 outputs, in a visual manner, the information produced by the device 100 from input of a user. Especially, the display unit 140 provides the side key setting menu under the control of the side key setting unit 122.

Figure 5:
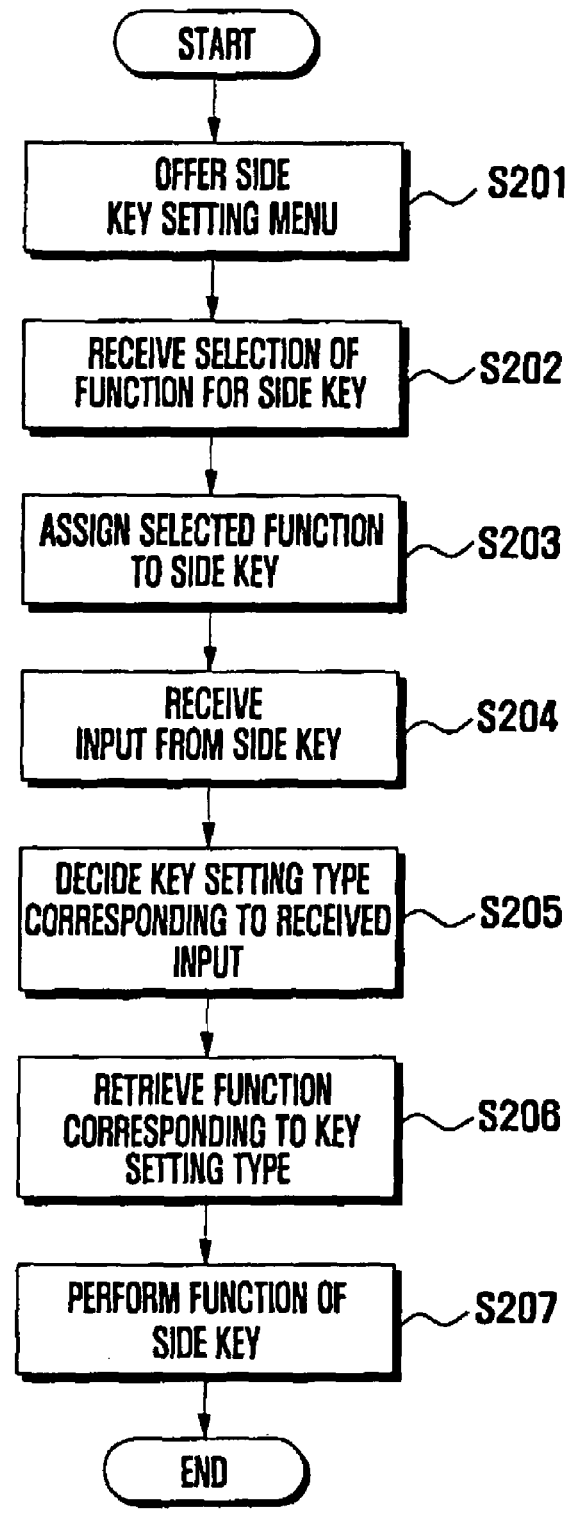
FIG. 5 is a flow diagram showing a method for controlling a function-assignable side key of a mobile communication device in accordance with the present invention.

FIG. 5 shows a method for controlling a function-assignable side key of a mobile communication device in accordance with the present invention.

Referring to FIGS. 4 and 5, the side key setting unit 122 of the control unit 120 offers the side key setting menu to the display unit 140 in step S201. Then, in step S202, the side key setting unit 122 receives a selection of functions for a specific side key 112 from the key input unit 110 by a choice of a user. Such a selection may be different according to operation mode and key press time for each button of the side key 112. Then, in step S203, the side key setting unit 122 assigns the selected function to the specific side key 112 and stores the selected function into the key function database 132 of the memory unit 130.

Next, the key function decision unit 124 of the control unit 120 receives an input signal from the specific side key 112 in step S204. Then, in step S205, the key function decision unit 124 decides a key setting type corresponding to the received input signal. Specifically, once the key function decision unit 124 receives an input signal from a specific button of the side key 112, the key function decision unit 124 determines which of the buttons is pressed, whether the mode is an idle mode or a menu mode, and whether the press time is short or long. Then, in step S206, the key function decision unit 124 retrieves the function corresponding to the determined key setting type from the key function database 132.

Next, the function execution unit 126 performs the retrieved function of the side key in step S207, depending on the result of decision by the key function decision unit 124.

As previously discussed, a side key according to the present invention has various functions differently and independently assigned thereto. In addition, functions and applications of a mobile communication device can be easily and quickly accessed and executed through the function-assignable side key. In the present invention, the side key includes three adjacent buttons, each of which has changeable functions assigned according to the operation mode and key press time associated with the button.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A mobile communication device comprising:
    a side key disposed on a side of a device body and having at least three buttons, each button having at least two functions assigned differently and independently according to key setting types comprising an operation mode and a key press time;
    a key function database storing the key setting types and assignable functions of each key setting type;
    a side key setting unit establishing the functions of each button of the side key according to the key setting types and storing the established functions in the key function database;
    a key function decision unit receiving a press input from one of the buttons, determining a key setting type corresponding to the press input, and retrieving the established function corresponding to the determined key setting type from the key function database; and
    a function execution unit performing the retrieved function of the one of the buttons.

2. The mobile communication device of claim 1, wherein the operation mode comprises an idle mode and a menu mode.

3. The mobile communication device of claim 2, wherein the function assigned in the idle mode is to act as a shortcut key, and the function assigned in the menu mode is to act as a specific function key.

4. The mobile communication device of claim 1, wherein the key press time comprises a short press and a long press.

5. The mobile communication device of claim 1, wherein the buttons have an upper button, a middle button and a lower button, which are disposed in a row.

6. The mobile communication device of claim 5, wherein the middle button has, in an idle mode, a first function selected among a main menu, a phone book search, a call log view, voice recognition, take a photo, a help page view, an e-mail write, a message write, and none, and has, in a menu mode, a second function corresponding to one selected among an OK key, a left soft key, a right soft key, and none.

7. The mobile communication device of claim 5, wherein each of the upper button and the lower button has, in an idle mode, a first function selected among a call log view, voice recognition, take a photo, a help page view, an e-mail write, a message write, a ring tone volume control, and none, and has, in a menu mode, a second function selected between a volume control and a menu navigation.

8. A method for controlling a side key of a mobile communication device, the method comprising:
    assigning at least two functions to each button of the side key having at least three buttons according to key setting types comprising an operation mode and a key press time;
    receiving a press input from one of the buttons;
    determining the key setting type corresponding to the received press input;
    retrieving a function corresponding to the determined key setting type from the assigned functions; and
    performing the retrieved function of the one of the buttons.

9. The method of claim 8, wherein the operation mode comprises an idle mode and a menu mode.

10. The method of claim 9, wherein the function assigned in the idle mode is to act as a shortcut key, and the function assigned in the menu mode is to act as a specific function key.

11. The method of claim 8, wherein the key press time comprises a short press and a long press.

12. The method of claim 8, wherein the assigning of the functions of the side key includes establishing the side key, in an idle mode, to have a first function selected among a main menu, a phone book search, a call log view, voice recognition, take a photo, a help page view, an e-mail write, a message write, and none, and establishing the side key, in a menu mode, to have a second function corresponding to one selected among an OK key, a left soft key, a right soft key, and none.

13. The method of claim 8, wherein the assigning of the functions of the side key includes establishing the side key, in an idle mode, to have a first function selected among a call log view, voice recognition, take a photo, a help page view, an e-mail write, a message write, a ring tone volume control, and none, and establishing the side key, in a menu mode, to have a second function selected between a volume control and a menu navigation.

* * * * *